Aug. 28, 1934.  E. ATTESLANDER  1,971,673
FRAME FOR VERTICAL RECIPROCATING ENGINES
Filed July 29, 1932
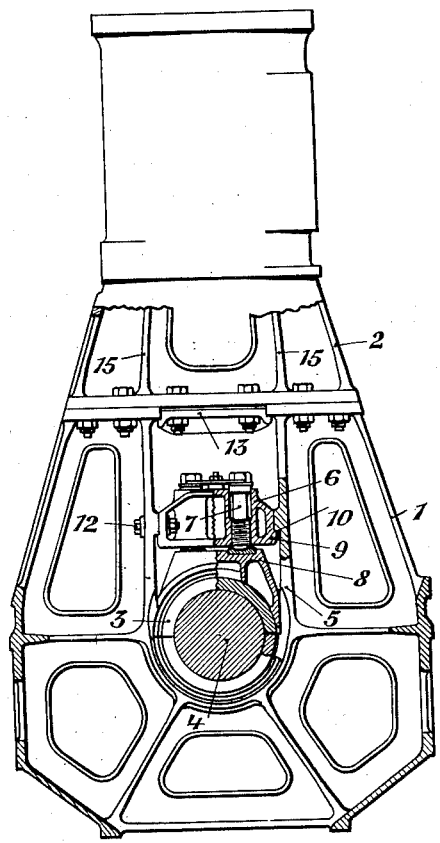
INVENTOR:
Edouard Atteslander
BY
Pennie Davis Marvin & Edmonds
ATTORNEY.

Patented Aug. 28, 1934

1,971,673

UNITED STATES PATENT OFFICE 1,971,673

FRAME FOR VERTICAL RECIPROCATING ENGINES

Edouard Atteslander, Winterthur, Switzerland, assignor to firm: Sulzer Frères Société Anonyme, Winterthur, Switzerland Application July 29, 1932, Serial No. 626,023
In Switzerland August 13, 1931

2 Claims. (Cl. 121—194)

This invention relates to frames for vertical reciprocating engines of the kind in which stresses are transmitted between the cylinder and crankshaft through a U-shaped frame member which passes beneath the crankshaft.

In frames of this type as hitherto proposed the U-shaped member has been subjected throughout its length to alternate tensile and compressive stresses so that this frame member has necessarily been made of large dimensions and sometimes inconveniently heavy. These compressive forces are set up in the U-shaped strap when the mechanism is subjected to the following stresses: in single acting machines, due to acceleration forces in driving gear and pistons, and in compressors and pumps, during the suction stroke. In double acting machines, the compression stroke (and the expansion stroke in internal combustion engines) causes tractive forces in the mechanism on the inner side of the cylinder. The present invention has for its object to provide an improved construction wherein the dimensions of the U-shaped frame member can be reduced.

According to the present invention a cross-piece is provided between and connected to the two arms of the U-shaped member above and in contact with a bearing cap on the crankshaft, whereby part of the stresses are transmitted from the crankshaft through the bearing cap and cross-piece to the U-shaped frame member. In this way that part of the U-shaped member adjacent to the crankshaft and below the cross-piece is not subjected to any appreciable compressive stresses since substantially all stresses of a compressive nature are transmitted through the cross-piece to the upper part of the U-shaped frame member.

Conveniently the cross-piece engages lugs or projections on the two arms of the U-shaped member and one or more studs or bolts are provided in screwthreaded engagement with the cross-piece and are adapted to be adjusted so as to bear against a bearing cap on the crankshaft and thus press the cross-piece into engagement with the lugs. Preferably movement of the cross-piece relatively to the U-shaped member in a direction parallel to the crankshaft is positively prevented. The construction and position of the cross piece member prevents any buckling of the legs of the U-shaped frame structure which may be due to any straining forces placed upon the legs during the operation of the motor device. A reinforcing or stiffening member may be provided between the two arms of the U-shaped frame member above the cross-piece.

When the frame is of the type comprising two super-imposed parts the two arms of the U-shaped frame member in the lower part are preferably arranged in alignment respectively with two corresponding force-transmitting frame members in the upper part.

One construction of frame embodying the invention is illustrated somewhat diagrammatically and by way of example in the accompanying drawing and comprises a lower part 1 and an upper part 2 superimposed upon the lower part. The stresses are transmitted between the cylinder in the upper part 2 and the crankshaft bearing 3 of the crankshaft 4 through a U-shaped frame member 5 which passes beneath the crankshaft 4 as shown.

A cross-piece 6 arranged between the two arms of the U-shaped member 5 above the crankshaft 4 is provided with studs 7 which can be adjusted relatively to the cross-piece 6 so as to bear against a bearing cap 8 and thereby press lugs 9 on the cross-piece into engagement with cooperating lugs 10 on the arms of the U-shaped member 5. Movement of the cross-piece 6 relatively to the U-shaped frame member 5 in a direction parallel to the crankshaft 4 is positively prevented by a securing bolt 12.

It will therefore be seen that stresses of a compressive nature will be transmitted from the bearing cap 8 through the cross-piece 6 and thence to the upper part of the U-shaped member 5 whereby that portion of the U-shaped member which lies adjacent to the crankshaft, that is to say below the lugs 10, will be subjected only to stresses of a tensile nature.

With a view to stiffening the upper end of the U-shaped frame member 5 a separate reinforcing member 13 is provided secured to the lower portion of the upper part 2 of the frame and which closes the upper end of the portion 1 of the frame. This reinforcing member can be detached for the purpose of withdrawing the crankshaft 4. The reinforcing member 13 provides means for reducing or preventing any buckling of the open ends of the upright legs of the U-shaped frame structure that may be caused by straining forces exerted upon said structure during the operating of the motor device.

The two arms of the U-shaped frame member 5 in the lower part 1 of the frame are arranged in alignment with two corresponding force-transmitting frame members 15 so that the forces between the cylinder and crankshaft are transmitted directly through the arms of the U-shaped member and the force-transmitting frame members 15 which thus serve, in effect, as extensions of the two arms of the U-shaped frame member.

I claim:

1. In a frame for vertical reciprocating engines, said frame having an upper and lower part, the combination of a crankshaft bearing, a unitary U-shaped member having free arms and passing beneath the crankshaft bearing and connected with its free arms to the upper part of the frame, said arms taking up both the tensile and compression stresses, a removable cross-piece provided between and detachably connected to said tensile and compression stress take up arms of the U-shaped member, said cross-piece transmitting the compression stresses to said arms and preventing any buckling of the free arms of the U-shaped frame member, a bearing cap on the crankshaft bearing below said cross-piece and means between the bearing cap and the cross-piece bearing against the bearing cap and adjustable relative to the cross-piece.

2. In a frame as claimed in claim 1, a separate flat reinforcing member provided between the two arms of the U-shaped member above the cross-piece, said reinforcing member being detachably secured to the lower portion of the upper part of the frame structure.

EDOUARD ATTESLANDER.